(12) United States Patent
Sudo et al.

(10) Patent No.: US 11,912,956 B2
(45) Date of Patent: *Feb. 27, 2024

(54) SLIDING MEMBER (71) Applicants: TOYOTA JIDOSHA KABUSHIKI KAISHA, Toyota (JP); KYODO YUSHI CO., LTD., Fujisawa (JP)

(72) Inventors: Junichi Sudo, Miyoshi (JP); Youji Kanehara, Nagoya (JP); Koushi Yamada, Odawara (JP); Kenichiro Sakurai, Toyota (JP); Ko Tanimura, Suzuka (JP); Tomonobu Komoriya, Chigasaki (JP)

(73) Assignees: TOYOTA JIDOSHA KABUSHIKI KAISHA, Toyota (JP); KYODO YUSHI CO., LTD., Fujisawa (JP)

( * ) Notice: Subject to any disclaimer, the term of this patent is extended or adjusted under 35 U.S.C. 154(b) by 190 days.

This patent is subject to a terminal disclaimer.

(21) Appl. No.: 17/376,684

(22) Filed: Jul. 15, 2021

(65) Prior Publication Data

US 2022/0017837 A1    Jan. 20, 2022

(30) Foreign Application Priority Data

Jul. 20, 2020 (JP) .................................. 2020-123838

(51) Int. Cl.
*C10M 125/02* (2006.01)
*C10M 169/00* (2006.01)
(Continued)

(52) U.S. Cl.
CPC ........ *C10M 169/00* (2013.01); *C10M 101/00* (2013.01); *C10M 115/08* (2013.01);
(Continued)

(58) Field of Classification Search
CPC .............. C10M 169/00; C10M 101/00; C10M 115/08; C10M 125/02; C10M 147/00;
(Continued)

(56) References Cited

U.S. PATENT DOCUMENTS

2002/0072477 A1    6/2002  Ikejima et al.
2005/0229730 A1    10/2005 Hori et al.
(Continued)

FOREIGN PATENT DOCUMENTS

CN    102105573 A    6/2011
EP      0613939 A2    9/1994
(Continued)

OTHER PUBLICATIONS

Junichi Sudo, Supplemental Notice of Allowability issued to U.S. Appl. No. 17/367,697 dated Dec. 14, 2022.
(Continued)

*Primary Examiner* — Taiwo Oladapo
(74) *Attorney, Agent, or Firm* — Dickinson Wright, PLLC (57) ABSTRACT

One aspect of the disclosure relates to a sliding member. The sliding member includes: a first sliding portion having a first lubricant placed between first parts of a first friction sliding mechanism; and a second sliding portion having a second lubricant placed between second parts of a second friction sliding mechanism. The first sliding portion has a lubricant feed port from which the first lubricant is fed, and the second sliding portion has no lubricant feed port from which the second lubricant is fed. The first lubricant contains base oil and an additive. The second lubricant contains base oil and an additive containing conductive carbon. The second lubricant contains a relatively larger amount of conductive carbon than the first lubricant.

17 Claims, 4 Drawing Sheets

(51) Int. Cl.
  *C10M 101/00* (2006.01)
  *C10M 115/08* (2006.01)
  *C10M 147/00* (2006.01)
  *C10M 161/00* (2006.01)
  *F16C 33/10* (2006.01)
  *F16C 33/66* (2006.01)
  *F16C 41/00* (2006.01)
  *C10N 40/08* (2006.01)
  *C10N 50/10* (2006.01)
  *F16C 3/02* (2006.01)
  *F16C 17/02* (2006.01)
  *F16C 17/04* (2006.01)

(52) U.S. Cl.
  CPC ........ *C10M 125/02* (2013.01); *C10M 147/00* (2013.01); *C10M 161/00* (2013.01); *F16C 33/102* (2013.01); *F16C 33/109* (2013.01); *F16C 33/1045* (2013.01); *F16C 33/6633* (2013.01); *F16C 33/6688* (2013.01); *F16C 41/002* (2013.01); *C10M 2201/041* (2013.01); *C10M 2203/1025* (2013.01); *C10M 2213/062* (2013.01); *C10M 2215/1026* (2013.01); *C10N 2040/08* (2013.01); *C10N 2050/10* (2013.01); *F16C 3/02* (2013.01); *F16C 17/02* (2013.01); *F16C 17/04* (2013.01); *F16C 2202/52* (2013.01); *F16C 2208/32* (2013.01); *F16C 2210/04* (2013.01); *F16C 2240/48* (2013.01); *F16C 2326/05* (2013.01); *F16C 2326/06* (2013.01); *F16C 2326/10* (2013.01); *F16D 2300/06* (2013.01)

(58) Field of Classification Search
  CPC .......... C10M 161/00; C10M 2201/041; C10M 2203/1025; C10M 2213/062; C10M 2215/1026; C10M 169/06; F16C 33/102; F16C 33/1045; F16C 33/109; F16C 33/6633; F16C 33/6688; F16C 41/002; F16C 3/02; F16C 17/02; F16C 17/04; F16C 2202/52; F16C 2208/32; F16C 2210/04; F16C 2240/48; F16C 2326/05; F16C 2326/06; F16C 2326/10; C10N 2040/08; C10N 2050/10; C10N 2040/02; F16D 2300/06; F16D 3/02; F16D 3/16; F16N 15/00; F16N 2200/00; F16N 2210/04; F16N 2210/14; B60R 17/00; B62D 7/18
  See application file for complete search history.

(56) References Cited

U.S. PATENT DOCUMENTS

| | | |
|---|---|---|
| 2007/0196632 A1 | 8/2007 | Meyer et al. |
| 2007/0265177 A1 | 11/2007 | Michioka et al. |
| 2008/0146474 A1 | 6/2008 | Takahashi et al. |
| 2008/0196995 A1 | 8/2008 | Mikami et al. |
| 2008/0219610 A1 | 9/2008 | Nakatani et al. |
| 2010/0234254 A1 | 9/2010 | Koshima et al. |
| 2011/0046027 A1 | 2/2011 | Zhamu et al. |
| 2011/0111993 A1 | 5/2011 | Shimura et al. |
| 2017/0275558 A1 | 9/2017 | Saito et al. |
| 2017/0362530 A1 | 12/2017 | Hirooka et al. |
| 2018/0057768 A1 | 3/2018 | Sakai et al. |
| 2019/0119595 A1 | 4/2019 | Tanaka et al. |
| 2019/0300813 A1 | 10/2019 | Shishikura |
| 2020/0032157 A1 | 1/2020 | Asai et al. |
| 2021/0348078 A1 | 11/2021 | Haramoto et al. |
| 2021/0403752 A1 | 12/2021 | Yamasaki |
| 2022/0017834 A1 | 1/2022 | Sudo et al. |
| 2022/0018398 A1 | 1/2022 | Sudo et al. |

FOREIGN PATENT DOCUMENTS

| | | | | |
|---|---|---|---|---|
| JP | 2004169862 A | | 6/2004 | |
| JP | 2006152092 A | | 6/2006 | |
| JP | 2010100702 A | | 5/2010 | |
| JP | 2010100703 A | | 5/2010 | |
| JP | 2014240676 A | * | 12/2014 | .......... F16C 33/7876 |
| JP | 2014240676 A | | 12/2014 | |
| JP | 2020012034 A | | 1/2020 | |
| JP | 2020117696 A | | 8/2020 | |
| JP | 2021-195015 A | | 12/2021 | |
| WO | 2010/010789 A1 | | 1/2010 | |
| WO | 2021/255517 A1 | | 12/2021 | |

OTHER PUBLICATIONS

Junichi Sudo et al., Office Action Issued to U.S. Appl. No. 17/364,856 dated Feb. 17, 2023.
Junichi Sudo, Notice of Allowance Issued to U.S. Appl. No. 17/367,697 dated Dec. 7, 2022.
Junichi Sudo et al., U.S. Appl. No. 17/367,697, filed Jul. 6, 2021.
Junichi Sudo et al., Office Action Issued To U.S. Appl. No. 17/367,697 dated May 27, 2022.
Junichi Sudo et al., U.S. Appl. No. 17/364,856, filed Jun. 30, 2021.
Junichi Sudo et al., Office Action Issued To U.S. Appl. No. 17/364,856 dated Apr. 7, 2022.
Junichi Sudo et al., Notice Of Allowance Issued To U.S. Appl. No. 17/364,856 dated Jul. 14, 2022.
Junichi Sudo et al., Office Action Issued To U.S. Appl. No. 17/364,856 dated Sep. 30, 2022.
Junichi Sudo et al., Notice of Allowance issued to U.S. Appl. No. 17/364,856 dated Apr. 5, 2023.

\* cited by examiner

SLIDING MEMBER

CROSS-REFERENCE TO RELATED APPLICATION

This application claims priority to Japanese Patent Application No. 2020-123838 filed on Jul. 20, 2020, incorporated herein by reference in its entirety.

BACKGROUND

1. Technical Field

The disclosure relates to a sliding member.

2. Description of Related Art

The body of an automobile is usually always positively charged due to the friction between the tires and the road surface caused when the automobile travels, disturbance, etc. Radio noise generated when this static charge is discharged from the body of the automobile may cause malfunction of electronic devices etc. mounted on the automobile. A technique has therefore been developed in which conductive grease is sealed in wheel bearings to remove static charge via the wheel bearings.

For example, a wheel bearing for an automobile described in Japanese Unexamined Patent Application Publication No. 2004-169862 (JP 2004-169862 A) is characterized by including: an outer bearing ring having an outer ring raceway on its inner peripheral surface; an inner bearing ring having an inner ring raceway on its outer peripheral surface; a plurality of rolling elements rollably arranged between the outer ring raceway and the inner ring raceway; and a cage rollably holding the rolling elements. In this wheel bearing, a grease composition containing, as essential components, base oil, a thickener composed of metal complex soap or a urea compound, and conductive carbon black with an average particle size of less than 2 µm is sealed in the space between the outer ring raceway and the inner ring raceway.

SUMMARY

As described above, lubricants containing a conductive additive such as carbon black in order to remove static charge from a sliding member and products (e.g., automobiles) equipped with the sliding member, and products using such a lubricant are known in the art. However, there related arts have some problems. When a lubricant is used in a sliding member, the lubricant is usually gradually colored and eventually turns black due to contamination with abrasion powder generated by friction sliding and/or deterioration of components of the lubricant. When an old lubricant is colored, it means it is time to replace it with a new one. However, for example, when conductive carbon such as carbon black is used as an additive for a lubricant, a new lubricant is usually black. When such a lubricant is used in a sliding member to which the lubricant is to be fed, it may be difficult to visually distinguish whether the lubricant is old or new when the lubricant is fed, because the new lubricant is also black similar to the old lubricant.

The disclosure provides a sliding member that makes it possible to remove static charge from the sliding member that is charged during use and a product (e.g., an automobile) equipped with the sliding member and/or to improve driving stability by the static charge removal, and that also makes it possible to easily distinguish whether a lubricant is old or new when the lubricant is fed.

Regarding a sliding member having a plurality of sliding portions, the inventors found that, by placing a lubricant containing either substantially no conductive carbon or a small amount of conductive carbon in a sliding portion having a lubricant feed port and placing a lubricant containing a relatively larger amount of conductive carbon than the lubricant in the sliding portion having no lubricant feed port, static charge can be removed from the sliding member and a product (e.g., an automobile) equipped with the sliding member and/or the driving stability can be improved by the static charge removal, and it is possible to easily distinguish whether the lubricant is old or new when the lubricant is fed. The inventors completed the disclosure based on the above findings.

(1) An aspect of the disclosure relates to a sliding member including:
- a first sliding portion that has a first friction sliding mechanism having at least two first parts and that has a first lubricant placed between the first parts; and
- a second sliding portion that has a second friction sliding mechanism having at least two second parts and that has a second lubricant placed between the second parts, wherein
- the first sliding portion has a lubricant feed port from which the first lubricant is fed,
- the second sliding portion has no lubricant feed port from which the second lubricant is fed,
- the first lubricant contains first base oil and a first additive,
- the second lubricant contains second base oil and a second additive containing conductive carbon, and
- the second lubricant contains a relatively larger amount of the conductive carbon than the first lubricant.

The first base oil and the second base oil may be either the same base oil or different base oils.

(2) The first lubricant may not contain the conductive carbon.

(3) The conductive carbon may be selected from the group consisting of carbon black, carbon nanotubes, carbon nanohorns, carbon nanofibers, graphene, and graphite.

(4) The second lubricant may further contain polytetrafluoroethylene as the second additive.

(5) The first lubricant and the second lubricant may further contain a thickener and may be in a form of a grease composition.

(6) The sliding member may be a sliding member for an automobile.

(7) The sliding member may be a propeller shaft.

(8) The sliding member may be a front suspension system.

According to the aspect of the disclosure, a sliding member is provided that makes it possible to remove static charge from the sliding member that is charged during use and a product (e.g., an automobile) equipped with the sliding member and/or to improve driving stability by the static charge removal, and that also makes it possible to easily distinguish whether a lubricant is old or new when the lubricant is fed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Preferred embodiments of the disclosure will be described in detail.

1. Sliding Member

Regarding a sliding member having a plurality of sliding portions, the inventors found that, by placing a lubricant containing either substantially no conductive carbon or a small amount of conductive carbon in a sliding portion having a lubricant feed port and placing a lubricant containing a relatively larger amount of conductive carbon than the lubricant in the sliding portion having no lubricant feed port, static charge can be removed from the sliding member and a product (e.g., an automobile) equipped with the sliding member and/or the driving stability can be improved by the static charge removal, and it is possible to easily distinguish whether the lubricant is old or new when the lubricant is fed. Therefore, one aspect of the disclosure relates to a sliding member.

The sliding member of the aspect includes a first sliding portion and a second sliding portion. The first sliding portion has a first friction sliding mechanism having at least two first parts and has a first lubricant placed between the two first parts. The second sliding portion has a second friction sliding mechanism having at least two second parts and has a second lubricant placed between the two second parts. The first sliding portion and the second sliding portion are separate members and are disposed at different positions from each other. The sliding member of the aspect may include another sliding portion, as desired, in addition to the first sliding portion and the second sliding portion. The other sliding portion has a friction sliding mechanism having at least two parts and has a lubricant placed between the two parts. The lubricant placed in the other sliding portion may be the first lubricant, the second lubricant, or another lubricant. Hereinafter, the first parts and the second parts are also simply referred to as parts. The first friction sliding mechanism and the second friction sliding mechanism are also simply referred to as friction sliding mechanisms.

In the sliding member of the aspect, the number of first sliding portions, the number of second sliding portions, and the number of other sliding portions are not limited and can be set independently of each other as desired. For example, the sliding member of the aspect may include one first sliding portion and one second sliding portion, may include one first sliding portion, one second sliding portion, and one other sliding portion, or may include one first sliding portion and a plurality of (e.g., two to five) second sliding portions. In an embodiment in which the sliding member includes a plurality of first sliding portions, a plurality of second sliding portions, and/or a plurality of other sliding portions, the first sliding portions may be either the same or different from each other, the second sliding portions may be either the same or different from each other, and the other sliding portions may be either the same or different from each other. In the embodiment in which the sliding member includes the first sliding portions, the second sliding portions, and/or the other sliding portions, a plurality of first lubricants placed in the first sliding portions may be either the same or different from each other, a plurality of second lubricants placed in the second sliding portions may be either the same or different from each other, and a plurality of other lubricants placed in the other sliding portions may be either the same or different from each other.

As will be described below, the sliding member of the aspect is one member that is handled as a single member and that includes the first sliding portion and the second sliding portion. In some cases, among members that are applied to a specific product (for example, an automobile), one member includes the first sliding portion and another member includes the second sliding portion. When these members are configured to be handled separately from each other, the combination of these members does not corresponds to the sliding member of the aspect. For example, in an automobile, even when both a sleeve and a spline (e.g., a sleeve and a spline of a steering shaft) that frictionally slide on each other include the first sliding portion, and an axle rolling bearing (e.g., a hub bearing) includes the second sliding portion, the combination of these members are not included in the sliding member of the aspect because these members are usually handled as separate members.

In the sliding member of this aspect, the first lubricant contains first base oil and an additive, the second lubricant contains second base oil and an additive containing conductive carbon, and the second lubricant contains a relatively larger amount of conductive carbon than the first lubricant.

In other words, the first lubricant contains substantially no conductive carbon or contains a relatively smaller amount of conductive carbon than the second lubricant. For the sliding member of the aspect having the above characteristics, static charge can be removed from the sliding member and a product (e.g., an automobile) equipped with the sliding member and/or driving stability of the product can be improved by the static charge removal. The first base oil and the second base oil may be either the same base oil or different base oils.

The reason why static charge can be removed from the sliding member and a product (e.g., an automobile) equipped with the sliding member and/or the driving stability of the product can be improved by the static charge removal in each aspect of the disclosure as described above is as follows. Each aspect of the disclosure is not limited to the following functions and principles. The body of an automobile is usually always positively charged due to the friction between the tires and the road surface caused when the automobile travels, disturbance, etc. Air is also usually positively charged. Accordingly, when the automobile travels, an electrostatic repulsive force is generated between the surface of the body of the automobile and the air, and repulsion away from the automobile is generated in the air flow near the surface of the body of the automobile. The tires of the automobile are also usually positively charged due to contact with the road surface. The silica content of tires has been especially increasing recently due to the growing demand for energy saving tires. Such tires with a high silica content tend to be positively charged. Due to such charging as described above, the automobile cannot provide desired aerodynamic performance and/or driving performance, and as a result, the driving stability of the automobile may be reduced. In the sliding member of the aspect, the second lubricant containing base oil and an additive containing conductive carbon is used in the second sliding portion. The positive charge on the surface of the body of the automobile and/or the tires can thus be removed by the conductive carbon in the second lubricant via the second sliding portion. Accordingly, in the sliding member of the aspect, since the second lubricant is used in the second sliding portion, the charge on the sliding member and a product (e.g., the surface of a body of an automobile and/or tires of the automobile) equipped with the sliding member can be removed, and the driving stability of the product (e.g., an automobile) can be improved.

In each aspect of the disclosure, the effect of removing charge from the sliding member and the product (e.g., the surface of the body of the automobile and/or the tires of the automobile) equipped with the sliding member can be, but not limited to, quantitatively measured by applying the sliding member of the aspect to an automobile to prepare a test vehicle, measuring a change in potential on the surface of the test vehicle and/or the tires of the test vehicle over time during traveling of the test vehicle by using a non-contact surface potential measurement device (e.g., capable of measuring the surface potentials of the positive and negative electrodes in the range of 0.1 to 5 kV), and comparing the measurement results of the test vehicle with the measurement results of a comparative test vehicle.

In each aspect of the disclosure, the driving stability of the automobile mainly means the stability of dynamic performance related to steering out of the basic dynamic performance of the automobile such as "running, turning, and stopping." The driving stability of the automobile can be defined based on, e.g., the followability and responsiveness of the automobile when the driver of the automobile actively steers the steering wheel, the course keeping capability of the automobile when the driver of the automobile does not actively steer the steering wheel, the convergence properties for external factors such as road surface shape or crosswind, etc. In each aspect of the disclosure, the driving stability of the automobile can be, but not limited to, quantitatively measured by preparing a test vehicle of the automobile to which the sliding member of the aspect is applied and evaluating the responsiveness of the test vehicle to maneuvering of the test vehicle. In this method, for example, the maneuvering of the test vehicle can be measured by the steering angle of the steering wheel, and the responsiveness of the behavior of the test vehicle can be measured by the vehicle yaw angular acceleration. The steering angle of the steering wheel can be measured by, e.g., a steering angle sensor or a controller area network (CAN) data logger that is mounted on the vehicle. The vehicle yaw angular acceleration can be measured by, e.g., a gyro sensor etc.

In each aspect of the disclosure, the automobile means a vehicle having four, two, or any other number of rubber wheels (tires) and including a prime mover such as an engine or a motor.

In the sliding member of the aspect, the first sliding portion has a lubricant feed port from which the first lubricant is fed, and the second sliding portion has no lubricant feed port from which the second lubricant is fed. In other words, there is a possibility that the first lubricant may be fed in the course of usage of the sliding member of the aspect, whereas there is substantially no possibility that the second lubricant may be fed in the course of usage of the sliding member of the aspect.

As described above, since the second lubricant placed between the parts of the friction sliding mechanism of the second sliding portion contains conductive carbon as an additive, a new second lubricant is also usually black. Accordingly, even when the second lubricant is gradually colored due to contamination with abrasion powder generated by friction sliding of the second sliding portion and/or deterioration of components of the second lubricant, it may be difficult to visually identify the color change and to distinguish whether the second lubricant is old or new. However, since there is substantially no possibility that the second lubricant may be fed in the course of usage of the sliding member of the aspect, there will be no particular disadvantage associated with the difficulty in visually identifying the color change of the second lubricant and in distinguishing whether the second lubricant is old or new. On the other hand, since the first lubricant placed between the parts of the friction sliding mechanism of the first sliding portion contains substantially no conductive carbon or contains a relatively smaller amount of conductive carbon than the second lubricant, a new first lubricant is usually colorless or is relatively lighter black than the second lubricant. Accordingly, when the first lubricant is gradually colored and eventually turns black due to contamination with abrasion powder generated by friction sliding of the first sliding portion and/or deterioration of components of the first lubricant, the color change of the first lubricant can be easily visually identified. It is also easy to visually distinguish whether the first lubricant is old or new. There is a possibility that the first lubricant may be fed in the course of usage of the sliding member of the aspect. Therefore, in the sliding member of the aspect having the above characteristics, it is easy to distinguish whether the first lubricant is old or new when the first lubricant is fed.

In the sliding member of the aspect, the base oil contained in the first lubricant and the base oil contained the second lubricant can be selected as appropriate from various base oils commonly used in the art such as mineral oils and synthetic oils. The base oil contained in the first lubricant and the base oil contained in the second lubricant may be either the same or different from each other. The mineral oil contained in the first lubricant and the mineral oil contained in the second lubricant may be either paraffinic mineral oil or naphthenic mineral oil, and is preferably paraffinic mineral oil. It is preferable that the mineral oil be mineral oil manufactured by combining, as appropriate, one or more desired refining means selected from, e.g., vacuum distillation, solvent deasphalting, solvent extraction, hydrocracking, solvent dewaxing, sulfuric acid cleaning, clay refining, hydrorefining, etc. The synthetic oil contained in the first lubricant and the synthetic oil contained in the second lubricant may be any of known synthetic oils such as hydrocarbon synthetic oils like poly-α-olefin oils using 1-decene as a starting material and co-oligomer oils of α-olefin and ethylene, phenyl ether synthetic oils, ester synthetic oils, polyglycol synthetic oils, and silicone oils, and is preferably hydrocarbon synthetic oil consisting only of carbon and hydrogen atoms.

The base oil may be composed of any of the mineral oils and synthetic oils mentioned above or may be composed of a mixture of a plurality of mineral oils and/or synthetic oils. The base oil preferably consists only of mineral oil. In the case of using the base oil consisting only of mineral oil, the cost can be reduced. Since the first lubricant and the second lubricant contain such base oil as described above, the first lubricant and the second lubricant exhibit desired fluidity when placed in the first sliding portion and the second sliding portion respectively in the sliding member of the aspect.

In the sliding member of the aspect, the base oil contained in the first lubricant and the base oil contained in the second lubricant preferably have a kinematic viscosity in the range of 40 to 200 mm$^2$/s, and more preferably in the range of 60 to 100 mm$^2$/s, at 40° C. When the kinematic viscosity of the base oil is lower than the lower limit of the above range, there may be a possibility that an oil film may not sufficiently be formed between the parts of the friction sliding mechanism of the first sliding portion and/or the second sliding portion in which the lubricant is used, and the sliding surfaces of the parts of the friction sliding mechanism may be damaged. When the kinematic viscosity of the base oil is higher than the upper limit of the above range, there is a possibility that the viscous resistance of the first lubricant and the second lubricant may increase and an increase in torque or heat generation may be caused between the parts of the friction sliding mechanism of the first sliding portion and/or the second sliding portion in which the lubricant is used. Accordingly, when the first lubricant and the second lubricant in the sliding member of the aspect contains base oil having a kinematic viscosity of the above range, a sufficient oil film is formed between the parts of the friction sliding mechanism of the first sliding portion and/or the second sliding portion in which the lubricant is used, and the first lubricant and the second lubricant exhibit desired fluidity.

In each aspect of the disclosure, the kinematic viscosity of the base oil etc. can be measured based on, but not limited to, e.g., JIS K 2283 using a glass capillary viscometer.

In the sliding member of the aspect, the first lubricant contains substantially no conductive carbon or contains a relatively smaller amount of conductive carbon than the second lubricant. It is preferable that the first lubricant contain substantially no conductive carbon. When the first lubricant contains a relatively smaller amount of conductive carbon than the second lubricant, the content of the conductive carbon in the first lubricant is preferably in the range of 0.1 to 10 mass %, more preferably in the range of 0.5 to 8 mass %, and even more preferably in the range of 2 to 8 mass %, based on the total mass of the first lubricant. Alternatively, the upper limit of the content of the conductive carbon in the first lubricant may be set to the lower limit of the content of the conductive carbon in the second lubricant. In this case, the content of the conductive carbon in the first lubricant is preferably in the range of 0.01 to 2 mass %, more preferably in the range of 0.01 to 0.5 mass %, and even more preferably in the range of 0.01 to 0.1 mass %, based on the total mass of the first lubricant. Since the conductive carbon is black, the first lubricant is usually colorless or relatively lighter black than the second lubricant when the first lubricant contains substantially no conductive carbon or the content of the conductive carbon in the first lubricant is in the above range. As described above, in the sliding member of the aspect, the first sliding portion has a lubricant feed port from which the first lubricant is fed. Accordingly, there is a possibility that the first lubricant may be fed in the course of usage of the sliding member of the aspect. However, since a new first lubricant is usually colorless or relatively lighter black than the second lubricant, a color change of the first lubricant that occurs in the course of usage of the sliding member of the aspect can be easily visually identified. It is also easy to visually distinguish whether the first lubricant is old or new. Accordingly, since the first lubricant contains substantially no conductive carbon or the content of the conductive carbon in the first lubricant is in the above range in the sliding member of the aspect having the above characteristics, it is easy to distinguish whether the first lubricant is old or new when the first lubricant is fed.

In the sliding member of the aspect, the second lubricant contains conductive carbon as an additive, and the second lubricant contains a relatively larger amount of conductive carbon than the first lubricant. The content of the conductive carbon in the second lubricant is preferably in the range of 0.1 to 15 mass %, more preferably in the range of 0.5 to 10 mass %, and even more preferably in the range of 2 to 8 mass %, based on the total mass of the second lubricant. When the content of the conductive carbon in the second lubricant is lower than the lower limit of the above range, there is a possibility that the second lubricant may not have enough conductive properties and static charge may not be sufficiently removed from a product (e.g., the surface of a body of an automobile and/or the tires of the automobile) that uses the sliding member of the aspect. When the content of the conductive carbon in the second lubricant is higher than the upper limit of the above range, there may be a possibility that the second lubricant may have reduced fluidity and may not sufficiently spread between the parts of the friction sliding mechanism of the second sliding portion in which the second lubricant is used. The driving stability of a product (e.g., an automobile) that uses the sliding member of the aspect can be improved by placing the second lubricant with the conductive carbon content of the above range between the parts of the friction sliding mechanism of the second sliding portion.

In the sliding member of the aspect, when the first lubricant contains conductive carbon, the conductive carbon contained in the first lubricant and the conductive carbon contained in the second lubricant may be either the same or different from each other. The conductive carbon can be selected as appropriate from various materials that are commonly used as a conductive material. The conductive carbon is preferably at least one material selected from the group consisting of carbon black, carbon nanotubes, carbon nanohorns, carbon nanofibers, graphene, and graphite, and is more preferably carbon black. The shape of the conductive carbon can be selected as appropriate from various shapes that are commonly used for a conductive material. The primary particle size of the conductive carbon is preferably in the range of 1 to 100 nm, and more preferably in the range of 5 to 50 nm. By placing the first lubricant and the second lubricant each containing conductive carbon having the above characteristics between the parts of the friction sliding mechanism of the first sliding portion and the parts of the friction sliding mechanism of the second sliding portion, or particularly placing the second lubricant between the parts of the friction sliding mechanism of the second sliding portion, the driving stability of a product (e.g., an automobile) that uses the sliding member of the aspect can be improved, and/or it is possible to easily distinguish whether the first lubricant is old or new when the first lubricant is fed.

In the sliding member of the aspect, it is preferable that the first lubricant and/or the second lubricant further contain polytetrafluoroethylene (PTFE) as an additive. When the first lubricant and the second lubricant contain PTFE, the PTFE contained in the first lubricant and the PTFE contained in the second lubricant may be either the same or different from each other. PTFE is known to be a substance that tends to be negatively charged. Accordingly, as the first lubricant and/or the second lubricant, particularly the second lubricant, contains PTFE as an additive in the embodiment, positive charge on a product (e.g., the surface of a body of an automobile and/or the tires of the automobile) that uses the lubricants can be neutralized, and charge on the surface of the body of the automobile and/or the tires of the automobile can be removed.

In the embodiment, the particle size of the PTFE is not particularly limited. The average particle size of the PTFE in particle size distribution is preferably in the range of 0.5 to 50 μm, and more preferably in the range of 1 to 15 μm. The content of the PTFE is preferably in the range of 0.1 to 15 mass %, more preferably in the range of 0.5 to 10 mass %, and even more preferably in the range of 1 to 8 mass %, based on the total mass of the first lubricant or the second lubricant. When the content of the PTFE is lower than the lower limit of the above range, there is a possibility that static charge may not be sufficiently removed from a product to which the sliding member of the present embodiment is applied (e.g., the surface of a body of an automobile and/or the tires of the automobile). When the content of the PTFE is higher than the upper limit of the above range, there is a possibility that the first lubricant and/or the second lubricant may have reduced fluidity and may not sufficiently spread in the first sliding portion and/or the second sliding portion in which the first lubricant and/or the second lubricant is used. The driving stability of a product (e.g., an automobile) that uses the sliding member of the aspect can further be improved by placing the first lubricant and/or the second lubricant each containing the PTFE having the above characteristics between the parts of the friction sliding mechanism of the first sliding portion and/or the parts of the friction sliding mechanism of the second sliding portion, or particularly placing the second lubricant between the parts of the friction sliding mechanism of the second sliding portion.

In the sliding member of the aspect, the first lubricant and/or the second lubricant may contain, as desired, one or more additional additives that are commonly used in the art. When the first lubricant and the second lubricant contain one or more additional additives, the one or more additional additives contained in the first lubricant and the one or more additional additives contained in the second lubricant may be either the same or different from each other. Examples of the additional additives include, but are not limited to, solid additives other than carbon black and PTFE (e.g., molybdenum disulfides, graphite, or melamine cyanurate (MCA)), extreme pressure agents (e.g., olefin sulfides, sulfurized esters, or sulfurized oils and fats), anti-wear agents (e.g., phosphate esters, acidic phosphate esters, acidic phosphate ester amine salts, zinc dithiophosphates, or zinc dithiocarbamates), oil agents (e.g., alcohols, amines, esters, or animal and plant oils and fats), antioxidants (e.g., phenolic antioxidants or amine antioxidants), rust inhibitors (e.g., fatty acid amine salts, zinc naphthenate, or metal sulfonates), and metal inactivating agents (e.g., benzotriazoles or thiadiazoles). When the first lubricant and/or the second lubricant contains additional additive(s), the additional additive(s) may be any of the additives mentioned above or may be a mixture of two or more of the additives.

In the sliding member of the aspect, it is preferable that the first lubricant and/or the second lubricant further contain a thickener. In the case of the embodiment, the first lubricant and/or the second lubricant can be in the form of a semi-solid or solid grease composition. The thickener can be selected as appropriate from various materials that are commonly used in the art such as a soap material and a non-soap material. An example of the soap material is lithium soap. Examples of the non-soap material include an organic material such as a diurea compounds or fluorine powder and an inorganic material such as silica powder, titania, alumina, or carbon fibers. In each aspect of the disclosure, the diurea compound is usually a compound represented by the following formula (I).

(I)

In formula (I), $R^1$ and $R^2$ are preferably substituted or unsubstituted $C_6$ to $C_{20}$ alkyls or substituted or unsubstituted $C_6$ to $C_{18}$ aryls, more preferably substituted or unsubstituted $C_6$ to $C_{18}$ aryls, even more preferably substituted or unsubstituted phenyls, independently of each other, and it is particularly preferable that both $R^1$ and $R^2$ are 4-methylphenyl. In each aspect of the disclosure, the diurea compound represented by the above formula (I), where $R^1$ and $R^2$ are substituted or unsubstituted $C_6$ to $C_{18}$ aryls independently of each other, are sometimes referred to as an "aromatic diurea compound." In the case of the embodiment, the thickener contained in the first lubricant and/or the second lubricant is preferably a diurea compound or lithium soap, or a mixture thereof, more preferably a diurea compound, and even more preferably an aromatic diurea compound. Since the first lubricant and/or the second lubricant contains such a thickener, the first lubricant and/or the second lubricant can exhibit high inflow properties in the sliding member of the embodiment.

It is preferable that the thickener be contained in the first lubricant and/or the second lubricant in such an amount that the worked penetration of the first lubricant and/or the second lubricant in the sliding member of the embodiment is in the range of 220 to 385. It is more preferable that the worked penetration be in the range of 265 to 340. The content of the thickener that meets the above requirement is usually in the range of 2 to 30 mass %, typically in the range of 3 to 25 mass %, and particularly in the range of 4 to 20 mass %, based on the total mass of the first lubricant or the second lubricant. When the content of the thickener is higher than the upper limit of the above range in the sliding member of the embodiment, there is a possibility that the lubricant may not sufficiently spread in the first sliding portion and/or the second sliding portion in which the first lubricant and/or the second lubricant is used. When the content of the thickener is lower than the lower limit of the above range in the sliding member of the embodiment, there is a possibility that the first lubricant and/or the second lubricant may be excessively softened and may leak from the first sliding portion and/or the second sliding portion. Accordingly, when the first lubricant and/or the second lubricant contains the thickener with the worked penetration of the above range in the sliding member of the embodiment, the first lubricant and/or the second lubricant will not leak from the first sliding portion and/or the second sliding portion and can exhibit desired fluidity.

For example, the worked penetration of the first lubricant and/or the second lubricant can be measured based on JIS K 22207.

The sliding member of the aspect can be used in any desired application such as an automobile or a diesel locomotive. It is preferable that the sliding member of the aspect be for an automobile. By using the sliding member of the aspect in the above application, static charge can be removed from the sliding member that is charged during use and a product (e.g., the surface of a body of an automobile and/or the tires of the automobile) equipped with the sliding member and/or the driving stability can be improved by the static charge removal, and it is also possible to easily distinguish whether the first lubricant is old or new when the first lubricant is fed.

Figure 1:
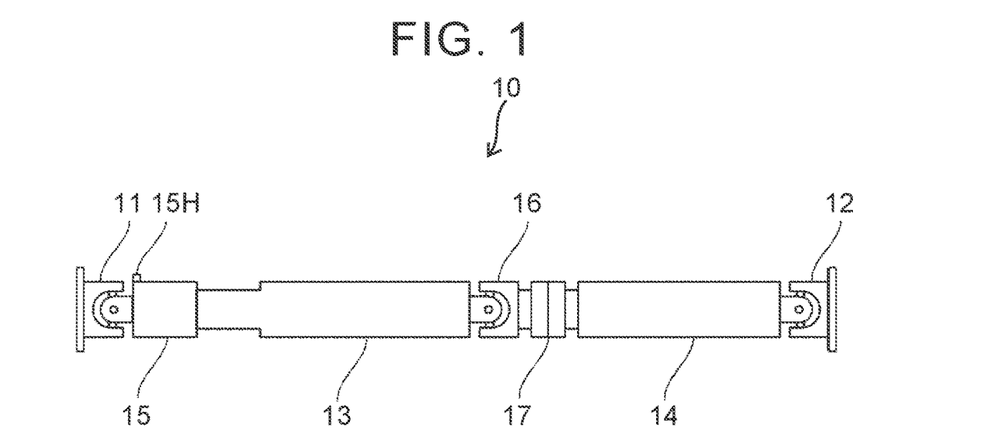
FIG. 1 schematically illustrates an embodiment of a sliding member of an aspect of the disclosure that is a propeller shaft.

The sliding member of the aspect can be applied to various members with a friction sliding mechanism. In one embodiment, it is preferable that the sliding member of the aspect be a propeller shaft. In this embodiment, it is preferable that the propeller shaft be mounted on an automobile, a diesel locomotive, etc. FIG. 1 schematically illustrates an embodiment of the sliding member of the aspect that is a propeller shaft. As shown in FIG. 1, a propeller shaft 10 includes joints 11, 12, intermediate shafts 13, 14, a slide connection portion 15, a joint 16, and a center bearing 17. The joints 11, 12 are disposed at opposite ends of the propeller shaft 10. The slide connection portion 15 is disposed between the joint 11 and the intermediate shaft 13. The joint 16 and the center bearing 17 are disposed between the intermediate shafts 13, 14. The joints 11, 12, and 16 are, e.g., Hooke's joints. The slide connection portion 15 includes a shaft and a bearing that frictionally slide on each other, and a lubricant feed port 15H for feeding a lubricant to the friction sliding surfaces of the shaft and the bearing. In the propeller shaft of the present embodiment, the numbers of intermediate shafts, joints, slide connection portions, and center bearings and the arrangement of these components are not limited to those shown in the figure. The propeller shaft may include any numbers of intermediate shafts, joints, slide connection portions, and center bearings, and these components may be arranged in any manner. In the propeller shaft 10 of the present embodiment, the slide connection portion 15 is the first sliding portion because it has the lubricant feed port 15H. The joints 11, 12, and 16 and the center bearing 17 are the second sliding portions because they have no lubricant feed port. The first lubricant is placed on the friction sliding surfaces of the shaft and the bearing of the slide connecting portion 15 that is the first sliding portion. The second lubricant is placed on the friction sliding surfaces of the joints 11, 12 and 16 and the center bearing 17 that are the second sliding portions. Since the first lubricant is placed on the friction sliding surfaces of the shaft and the bearing of the slide connection portion 15, a color change that occurs in the course of usage can be easily visually identified. It is also possible to easily visually distinguish whether the first lubricant is old or new when the new first lubricant is fed from the lubricant feed port 15H. By using the sliding member of the aspect, which is a propeller shaft, in a product (e.g., an automobile or a diesel locomotive), static charge can be removed from the product and/or the driving stability can be improved by the static charge removal, and it is also possible to easily distinguish whether the first lubricant is old or new when the first lubricant is fed.

Figure 2:
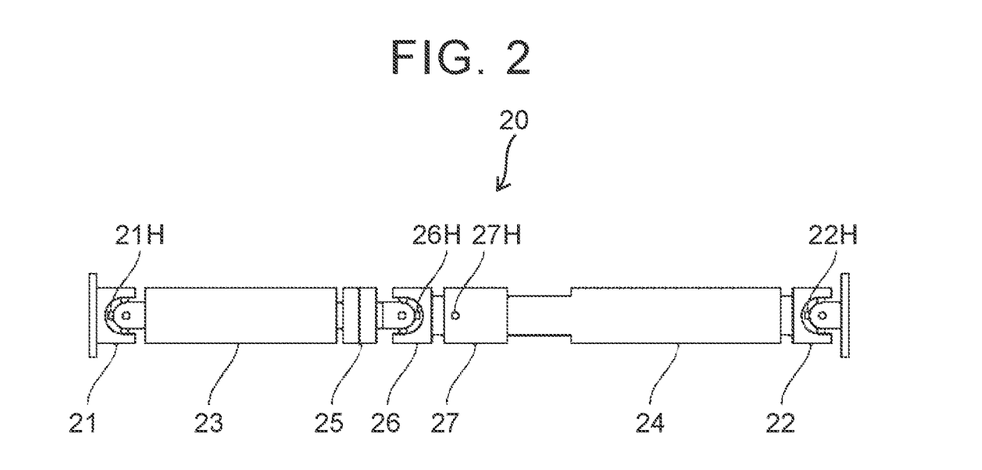
FIG. 2 schematically illustrates another embodiment of the sliding member of the aspect of the disclosure that is a propeller shaft.

FIG. 2 schematically illustrates another embodiment of the sliding member of the aspect that is a propeller shaft. As shown in FIG. 2, a propeller shaft 20 includes joints 21, 22, intermediate shafts 23, 24, a center bearing 25, a joint 26, and a slide connection portion 27. The joints 21, 22 are disposed at opposite ends of the propeller shaft 20. The center bearing 25, the joint 26, and the slide connection portion 27 are disposed between the intermediate shafts 23, 24. The joints 21, 22, and 26 are, e.g., Hooke's joints. The joints 21, 22 and 26 have lubricant feed ports 21H, 22H, and 26H for feeding a lubricant to the friction sliding surfaces, respectively. The slide connection portion 27 includes a shaft and a bearing that frictionally slide on each other, and a lubricant feed port 27H for feeding a lubricant to the friction sliding surfaces of the shaft and the bearing. In the propeller shaft of the present embodiment, the numbers of intermediate shafts, joints, slide connection portions, and center bearings and the arrangement of these components are not limited to those shown in the figure. The propeller shaft may include any numbers of intermediate shafts, joints, slide connection portions, and center bearings, and these components may be arranged in any manner. In the propeller shaft 20 of the present embodiment, the joints 21, 22, and 26, and the slide connection portion 27 are the first sliding portions because they have the lubricant feed ports 21H, 22H, 26H, and 27H. The center bearing 25 is the second sliding portion because it has no lubricant feed port. The first lubricant is placed on the friction sliding surfaces of the joints 21, 22, and 26 that are the first sliding portions and on the friction sliding surfaces of the shaft and the bearing of the slide connection portion 27 that is the first sliding portion. The second lubricant is placed on the friction sliding surface of the center bearing 25 that is the second sliding portion. Since the first lubricant is placed on the friction sliding surfaces of the joints 21, 22, and 26 and the friction sliding surfaces of the shaft and the bearing of the slide connection portion 27, a color change that occurs in the course of usage can be easily visually identified. It is also possible to easily visually distinguish whether the first lubricant is old or new when the new first lubricant is fed from the lubricant feed ports 21H, 22H, 26H, and 27H. By using the sliding member of the aspect, which is a propeller shaft, in a product (e.g., an automobile or a diesel locomotive), static charge can be removed from the product and/or the driving stability can be improved by the static charge removal, and it is also possible to easily distinguish whether the first lubricant is old or new when the first lubricant is fed.

Figure 3:
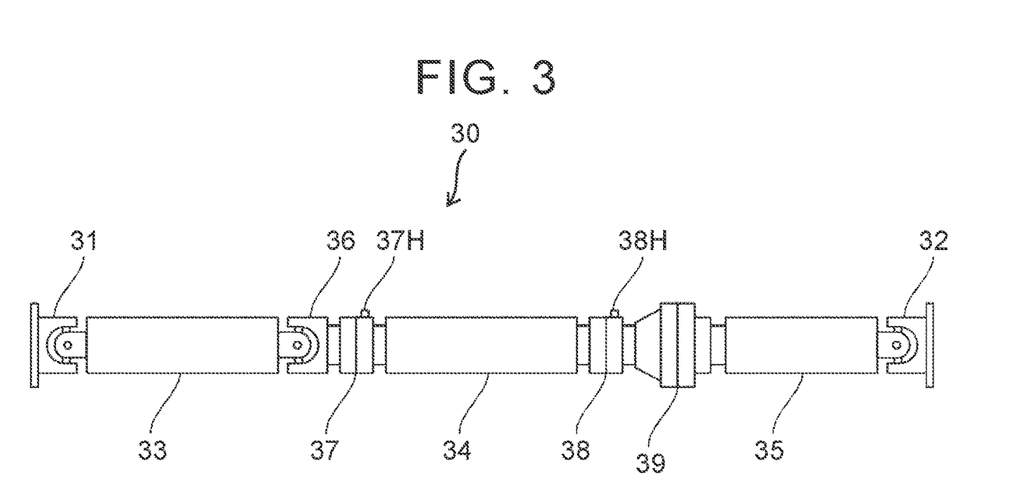
FIG. 3 schematically illustrates still another embodiment of the sliding member of the aspect of the disclosure that is a propeller shaft.

FIG. 3 schematically illustrates still another embodiment of the sliding member of the aspect that is a propeller shaft. As shown in FIG. 3, a propeller shaft 30 includes joints 31, 32, intermediate shafts 33, 34, and 35, a joint 36, center bearings 37, 38, and a joint 39. The joints 31, 32 are disposed at opposite ends of the propeller shaft 30. The joint 36 and the center bearing 37 are disposed between the intermediate shafts 33, 34. The center bearing 38 and the joint 39 are disposed between the intermediate shafts 34, 35. The joints 31, 32, and 36 are, e.g., Hooke's joints. The joint 39 is, e.g., a constant velocity joint. The center bearings 37, 38 have lubricant feed ports 37H, 38H for feeding a lubricant to the friction sliding surfaces, respectively. In the propeller shaft of the present embodiment, the numbers of intermediate shafts, joints, and center bearings and the arrangement of these components are not limited to those shown in the figure. The propeller shaft may include any numbers of intermediate shafts, joints, and center bearings, and these components may be arranged in any manner. In the propeller shaft 30 of the present embodiment, the center bearings 37, 38 are the first sliding portions because they have the lubricant feed ports 37H, 38H. The joints 31, 32, 36, and 39 are the second sliding portions because they have no lubricant feed port. The first lubricant is placed on the friction sliding surfaces of the center bearings 37, 38 that are the first sliding portions. The second lubricant is placed on the friction sliding surfaces of the joints 31, 32, 36, and 39 that are the second sliding portions. Since the first lubricant is placed on the friction sliding surfaces of the center bearings 37, 38, a color change that occurs in the course of usage can be easily visually identified. It is also possible to easily visually distinguish whether the first lubricant is old or new when the new first lubricant is fed from the lubricant feed ports 37H, 38H. By using the sliding member of the aspect, which is a propeller shaft, in a product (e.g., an automobile or a diesel locomotive), static charge can be removed from the product and/or the driving stability can be improved by the static charge removal, and it is also possible to easily distinguish whether the first lubricant is old or new when the first lubricant is fed.

Figure 4:
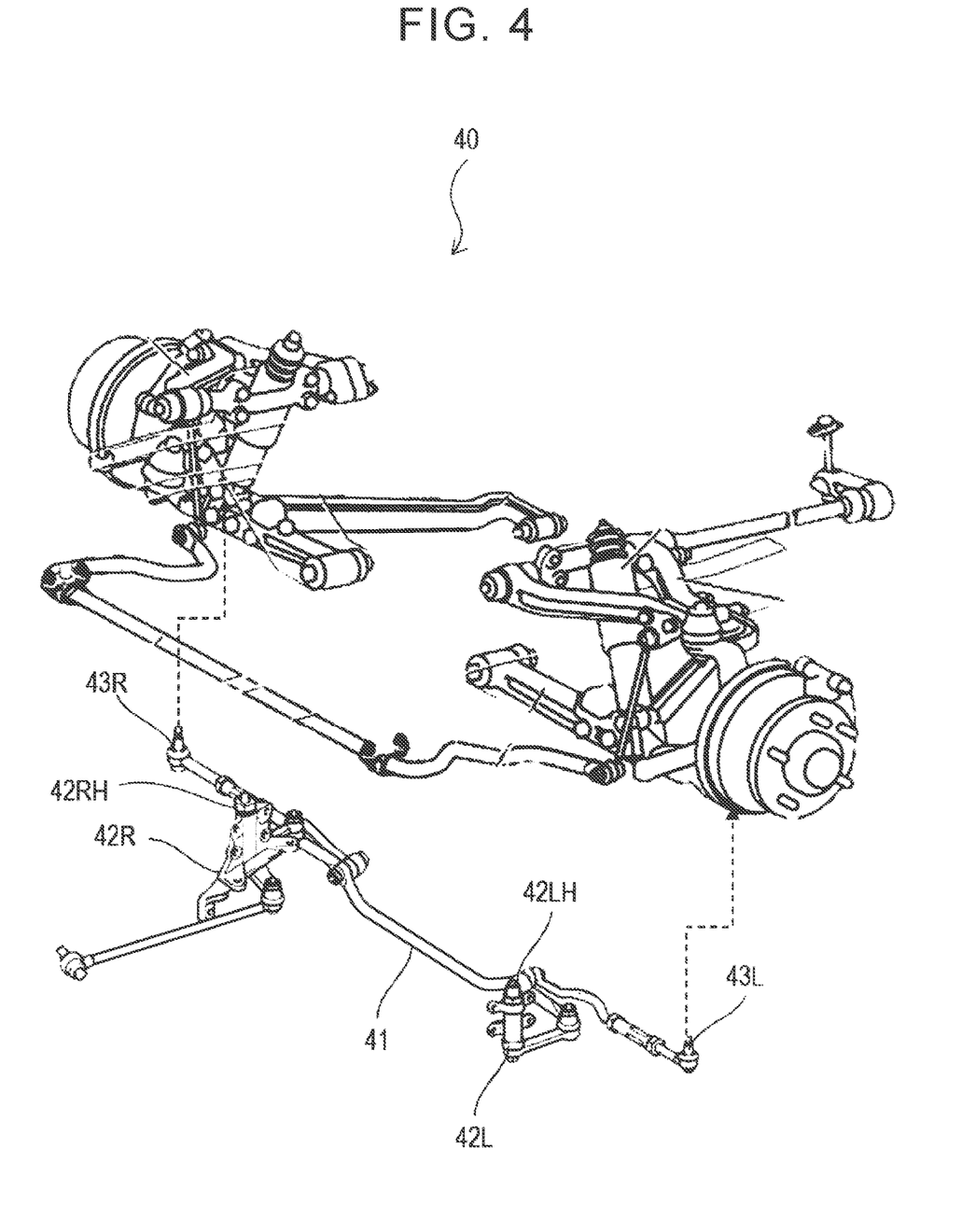
FIG. 4 schematically illustrates an embodiment of the sliding member of the aspect of the disclosure that is a front suspension system.

In a further embodiment, it is preferable that the sliding member of the aspect be a front suspension system. In the present embodiment, the front suspension system is usually mounted on an automobile. FIG. 4 schematically illustrates an embodiment of the sliding member of the aspect that is a front suspension system. As shown in FIG. 4, a front suspension system 40 includes a suspension arm 41, steering knuckles 42L, 42R attached to the suspension arm 41, and joints 43L, 43R attached to opposite ends of the suspension arm 41 and connected to wheel hubs. The joints 43L and 43R are, e.g., ball joints. The steering knuckles 42L, 42R have lubricant feed ports 42LH, 42RH for feeding a lubricant to friction sliding surfaces, respectively. In the front suspension system of the present embodiment, the numbers of suspension arms, steering knuckles, and joints and the arrangement of these components are not limited to those shown in the figure. The front suspension system may include any numbers of suspension arms, steering knuckles, and joints, and these components may be arranged in any manner. In the front suspension system 40 of the present embodiment, the steering knuckles 42L, 42R are the first sliding portions because they have the lubricant feed ports 42LH, 42RH. The joints 43L, 43R are the second sliding portions because they have no lubricant feed port. The first lubricant is placed on the friction sliding surfaces of the steering knuckles 42L, 42R that are the first sliding portions. The second lubricant is placed on the friction sliding surfaces of the joints 43L, 43R that are the second sliding portions. Since the first lubricant is placed on the friction sliding surfaces of the steering knuckles 42L, 42R, a color change that occurs in the course of usage can be easily visually identified. It is also possible to easily visually distinguish whether the first lubricant is old or new when the new first lubricant is fed from the lubricant feed ports 42LH, 42RH. By using the sliding member of the aspect, which is a front suspension system, in a product (e.g., an automobile), static charge can be removed from the product and/or the driving stability can be improved by the static charge removal, and it is also possible to easily distinguish whether the first lubricant is old or new when the first lubricant is fed.

2. Manufacturing Method of Sliding Member

Another aspect of the disclosure relates to a method for manufacturing the sliding member of the aspect of the disclosure. The method of the aspect includes a sliding portion preparation step, a sliding portion placement step, a lubricant preparation step, and a lubricant placement step.

In the method of the aspect, the sliding portion preparation step includes preparing the first sliding portion that has a friction sliding mechanism having at least two parts and that has a lubricant feed port, and preparing the second sliding portion that has a friction sliding mechanism having at least two parts and that has no lubricant feed port. This step may include preparing another sliding portion that has a friction sliding mechanism having at least two parts.

In this step, the first sliding portion, the second sliding portion, and the other sliding portion may be prepared by producing the member having a predetermined shape and structure or may be prepared by, e.g., purchasing the member.

In the method of the aspect, the sliding portion placement step includes placing the first sliding portion in a product (e.g., an automobile or a diesel locomotive) equipped with the sliding member manufactured by the method of the aspect and placing the second sliding portion in the product. This step may optionally include placing the other sliding portion at a desired position.

In the method of the aspect, the lubricant preparation step includes preparing the first lubricant containing base oil and an additive and preparing the second lubricant containing base oil and an additive containing conductive carbon and containing a relatively larger amount of conductive carbon than the first lubricant. This step may optionally include preparing another lubricant containing base oil and an additive.

This step can be performed by mixing components of each lubricant using kneading means that is commonly used in the art such as roll mills, Flyma mills, Charlotte mills, or homogenizers. In this step, the order in which the components are mixed is not particularly limited. For example, the additive and optionally a thickener may be simultaneously added to the base oil and mixed together or may be added separately (e.g., successively or at a predetermined time interval) to the base oil and mixed together.

In the method of the aspect, the lubricant placement step includes placing the first lubricant between the at least two parts in the friction sliding mechanism of the first sliding portion and placing the second lubricant between the at least two parts in the friction sliding mechanism of the second sliding portion. This step may optionally include placing the other lubricant between the at least two parts in the friction sliding mechanism of the other sliding portion.

3. Method for Improving Driving Stability of Product Equipped with Sliding Member Still another aspect of the disclosure relates to a method for improving the driving stability of a product (e.g., an automobile or a diesel locomotive) equipped with the sliding member of the above aspect of the disclosure. The method of the aspect includes using the first lubricant between the at least two parts in the friction sliding mechanism of the first sliding portion and using the second lubricant between the at least two parts in the friction sliding mechanism of the second sliding portion. The method of the aspect may optionally include using the other lubricant between the at least two parts in the friction sliding mechanism of the other sliding portion placed at the desired position. The first lubricant and the second lubricant that are used in the method of the aspect and the other lubricant that is optionally used in the method of the aspect are the lubricants described above.

By carrying out the method of the aspect for the sliding member of the aspect of the disclosure in which it is easy to distinguish between old and new first lubricants when the first lubricant is fed, the driving stability of the product (e.g., an automobile or a diesel locomotive) equipped with the sliding member can be improved.

The disclosure will be described in more detail with reference to examples. However, the technical scope of the disclosure is not limited to the examples.

I: Preparation of Lubricants

The lubricants of Example 1 and Comparative Example 1 were prepared in the form of a grease composition by adding a thickener (aromatic diurea compound, a reaction product of 4,4'-diphenylmethane diisocyanate and p-toluidine), carbon black (primary particle size: 10 to 20 nm), polytetrafluoroethylene (PTFE, average particle size in particle size distribution: 5 μm), and other additives (antioxidant, rust inhibitor, and anti-wear agent) to base oil (paraffinic mineral oil, kinematic viscosity: 75 mm$^2$/s (40° C.)) and kneading the resultant mixture with three roll mills. The structure of the aromatic diurea compound is shown below. Table 1 shows the content of each component in the lubricants of Example 1 and Comparative Example 1. In the table, the content of each component is shown in mass % based on the total mass of the lubricant.

TABLE 1

|  |  | Example 1 | Comparative Example 1 |
|---|---|---|---|
|  | Base oil | Balance | Balance |
|  | Thickener | 4 | 20 |
| Additive | Carbon Black | 5.0 | 0 |
|  | PTFE | 5.0 | 0 |
|  | Others | 1.8 | 1.8 |

II: Lubricant Performance Evaluation

Worked Penetration Measurement Test

The worked penetration of the lubricants of Example 1 and Comparative Example 1 was measured based on JIS K 22207. The measurement results show that the lubricants of Example 1 and Comparative Example 1 had a worked penetration of 300.

Driving Stability Measurement Test

The lubricants of Example 1 and Comparative Example 1 were sealed in axle rolling bearings (made by JTEKT, hub units with a double row angular contact ball bearing). The axle rolling bearings were attached to the four wheels, namely front and rear, right and left wheels, of test vehicles. Table 2 shows the specifications of the test vehicles.

TABLE 2

| Example/ Comparative Example | Vehicle | Vehicle Model | L/O | Outline of Specifications | Hub Unit Bearing | Tire |
|---|---|---|---|---|---|---|
| Example 1 | RX450h | GYL25W-AWXGB(L) | '16.8 | 3.5 L-HV Xe-4WD | Lubricant of Example 1 | Standard products 235/55/R20 |
| Comparative Example 1 |  |  |  |  | Lubricant of Comparative Example 1 |  |

Figure 5:
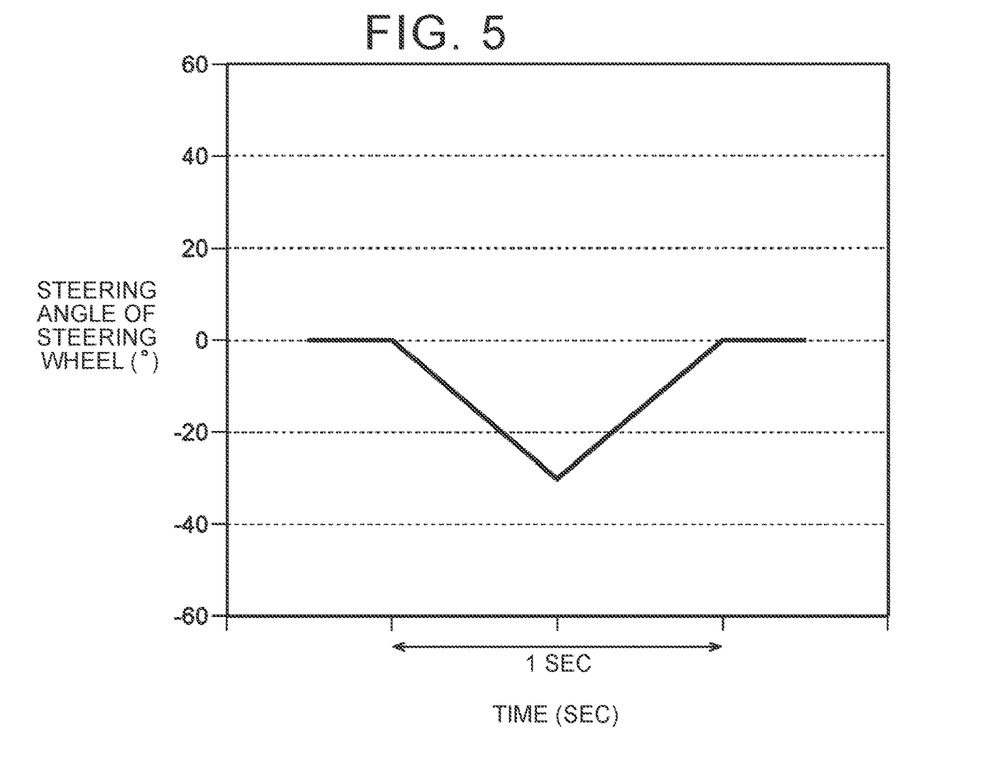
FIG. 5 is a graph showing a change in steering angle of a steering wheel over time during a lane change in a driving stability measurement test.

The test vehicles of Example 1 and Comparative Example 1 were run at 70 km/h. During traveling of the test vehicles, a lane change was repeatedly made based on a steering method for lane changes shown in FIG. 5. In the steering method shown in FIG. 5, the steering angle of a steering wheel is changed from 0° to −30° and back to 0° in one second (hereinafter, this change in steering angle of the steering wheel is also referred to as "60°/sec steering angle of the steering wheel"). The steering angle of the steering wheel and the vehicle yaw angular acceleration of the test vehicles of Example 1 and Comparative Example 1 were measured in the above running test. The steering angle of the steering wheel was measured by a steering angle sensor and a CAN data logger that were mounted on the vehicle. The vehicle yaw angular acceleration was measured by a gyro sensor (NAV440CA-200 made by Crossbow Technology Inc.).

Figure 6:
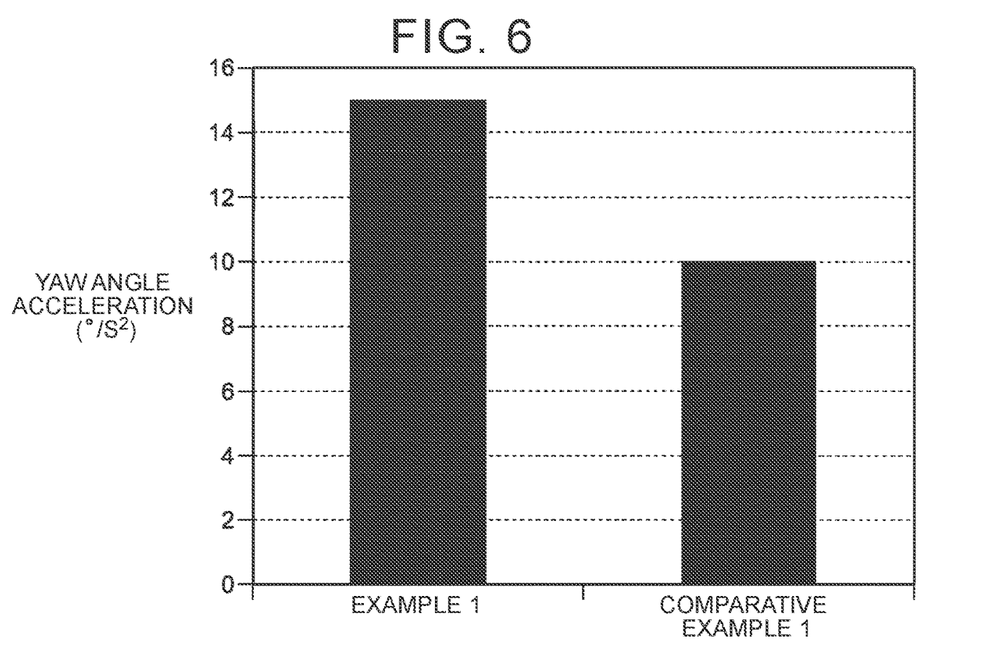
FIG. 6 is a graph showing the values of vehicle yaw angle acceleration of test vehicles of Example 1 and Comparative Example 1 for the 60°/sec steering angle of the steering wheel.

Responsiveness of the test vehicles to maneuvering of the test vehicles was evaluated in order to quantitatively measure the driving stability of the test vehicles. In this test, the maneuvering of the test vehicles was measured by the steering angle of the steering wheel, and the responsiveness of the behavior of the test vehicles was measured by the vehicle yaw angular acceleration. FIG. 6 shows the values of the vehicle yaw angle acceleration of the test vehicles of Example 1 and Comparative Example 1 for the 60°/sec steering angle of the steering wheel.

As shown in FIG. 6, the value of the vehicle yaw angular acceleration of the test vehicle of Example 1 was significantly higher than the value of the test vehicle of Comparative Example 1. This result shows that the use of the lubricant of Example 1 improved the responsiveness of the test vehicle to the steering of the steering wheel of the test vehicle, and as a result, improved the driving stability of the test vehicle.

Measurement Test of Static Charge Removal Effect of Vehicle Body

The lubricant of Example 2 was prepared under conditions similar to those for the lubricant of Example 1 except that the content of the thickener was 3 mass %, the content of carbon black was 5 mass %, the content of PTFE was 10 mass %, and the content of other additives was 1.8 mass %, and the content of the base oil was the balance. A test vehicle was prepared under conditions similar to those described above using the lubricant of Example 2.

Figure 7A:
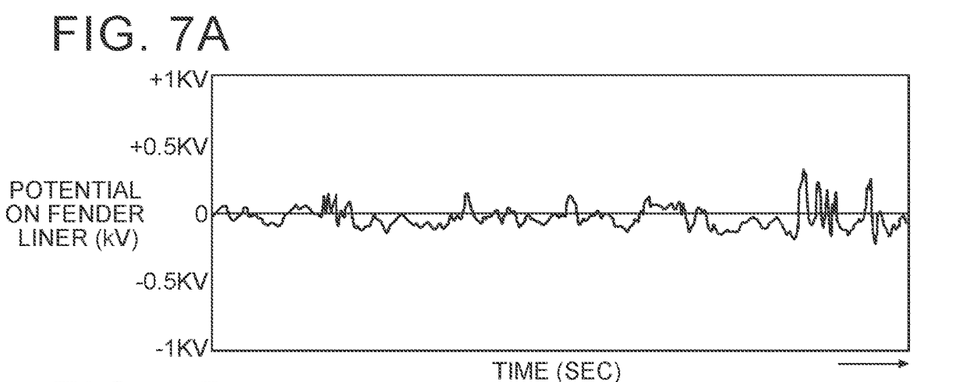
FIG. 7A is a graph showing a change in potential on a fender liner over time during traveling of the test vehicle of Comparative Example 1.
Figure 7B:
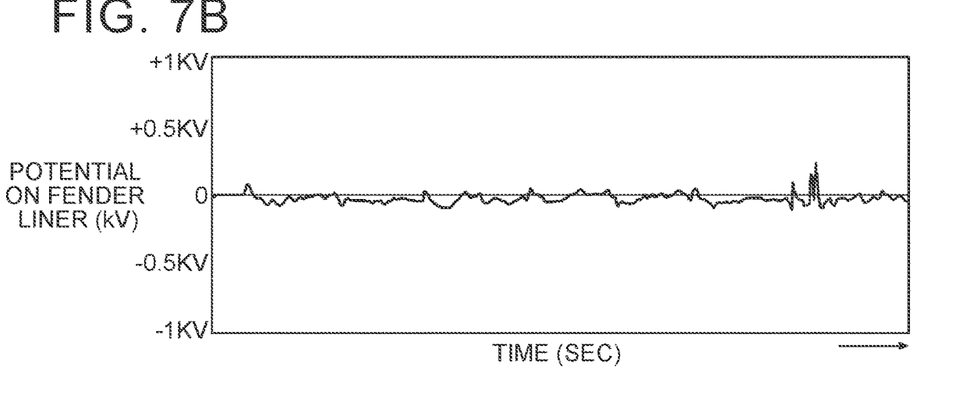
FIG. 7B is a graph showing a change in potential on a fender liner over time during traveling of a test vehicle of Example 2.

The test vehicles of Example 2 and Comparative Example 1 were run at about 100 km/h from the start of the test vehicles. During running of the test vehicles, the potential on a tire tread surface of a rear part of the left rear wheel and the potential on a fender liner (a part facing the tire tread surface) were measured using a non-contact surface potential measuring device (capable of measuring the surface potentials of the positive and negative electrodes in the range of 0.1 to 5 kV). FIGS. 7A and 7B show a change in potential on the fender liner over time. FIG. 7A shows the measurement results of the test vehicle of Comparative Example 1, and FIG. 7B shows the measurement results of the test vehicle of Example 2. In FIGS. 7A and 7B, the abscissa represents the elapsed time (sec) and the ordinate represents the potential (kV).

As shown in FIG. 7A, the potential fluctuated in the range of +0.34 to −0.24 kV in the test vehicle of Comparative Example 1. On the other hand, as shown in FIG. 7B, the potential fluctuated in the range of +0.09 to −0.12 kV in the test vehicle of Example 2. The above results show that the use of the lubricant of Example 2 reduced the fluctuation of the potential on the vehicle body during traveling of the vehicle to about ⅓ as the positive potential on the vehicle body and/or static charge on the tires was removed.

Measurement Test of Voltage Drop Time of Lubricants

Figure 8:
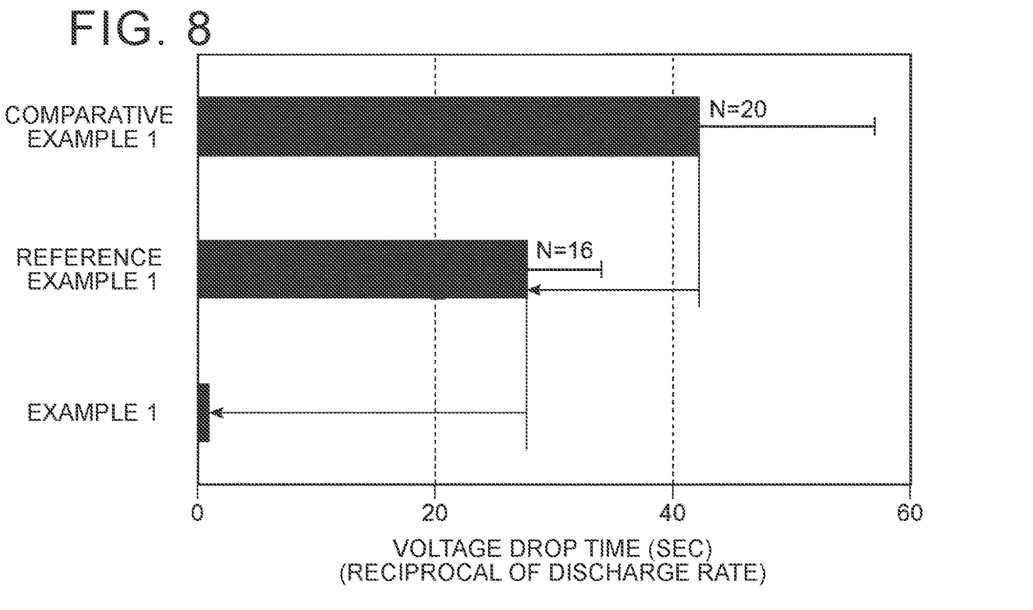
FIG. 8 is a graph showing the voltage drop time (the reciprocal of the discharge rate), which is an index of the discharge rate, of lubricants of Example 1, Reference Example 1, and Comparative Example 1, measured using a discharge characteristic evaluation device.

A lubricant of Reference Example 1 was prepared under conditions similar to those for the lubricant of Example 1 except that the content of the thickener was 19 mass %, the content of PTFE was 5 mass %, the content of other additives was 1.8 mass %, and the content of the base oil was the balance. A measurement test of the voltage drop time was carried out for the lubricants of Example 1, Reference Example 1, and Comparative Example 1 by using a discharge characteristic evaluation device. The voltage drop time is an index of the discharge rate. Each lubricant was sandwiched between a pair of electrodes and forcibly (positively) charged in a non-contact manner from the surface of one of the electrodes, and the amount of static charge was measured in a non-contact manner (static voltage). The time it took for the static voltage to drop to 0.2 kV or less was measured, and the measured value was used as the voltage drop time. FIG. 8 is a graph illustrating the voltage drop time (the reciprocal of the discharge rate), which is an index of the discharge rate, of the lubricants of Example 1, Reference Example 1, and Comparative Example 1. The voltage drop time was measured using the discharge characteristic evaluation device.

As shown in FIG. 8, the average value of the voltage drop time of the lubricant of Comparative Example 1 (containing neither PTFE nor carbon black) was 42.2 seconds. On the other hand, the average value of the voltage drop time of the lubricant of Reference Example 1 (containing PTFE) was 27.6 seconds. The above results show that static charge was neutralized by using the lubricant of Reference Example 1. The average value of the voltage drop time of the lubricant of Example 1 (containing PTFE and carbon black) was within 1.0 second. The above results show that static charge was further neutralized by using the lubricant of Example 1.

What is claimed is:

1. A sliding member, comprising:
   a first sliding portion that has a first friction sliding mechanism having at least two first parts and that has a first lubricant placed between the first parts; and
   a second sliding portion that has a second friction sliding mechanism having at least two second parts and that has a second lubricant placed between the second parts, wherein:
   the first sliding portion has a lubricant feed port from which the first lubricant is fed;
   the second sliding portion has no lubricant feed port from which the second lubricant is fed;
   the first lubricant contains first base oil and a first additive;
   the second lubricant contains second base oil and a second additive containing conductive carbon; and
   the second lubricant contains a relatively larger amount of the conductive carbon than the first lubricant;
   wherein the first lubricant contains 0.01 to 15 mass % of the conductive carbon based on total mass of the first lubricant.

2. The sliding member according to claim 1, wherein the first lubricant contains 0.1 to 10 mass % of the conductive carbon based on total mass of the first lubricant.

3. The sliding member according to claim 2, wherein the first lubricant contains 0.5 to 8 mass % of the conductive carbon based on the total mass of the first lubricant.

4. The sliding member according to claim 3, wherein the first lubricant contains 2 to 8 mass % of the conductive carbon based on the total mass of the first lubricant.

5. The sliding member according to claim 1, wherein the first lubricant contains 0.01 to 2 mass % of the conductive carbon based on total mass of the first lubricant.

6. The sliding member according to claim 5, wherein the first lubricant contains 0.01 to 0.5 mass % of the conductive carbon based on the total mass of the first lubricant.

7. The sliding member according to claim 6, wherein the first lubricant contains 0.01 to 0.1 mass % of the conductive carbon based on the total mass of the first lubricant.

8. The sliding member according to claim 1, wherein the second lubricant contains 0.1 to 15 mass % of the conductive carbon based on total mass of the second lubricant.

9. The sliding member according to claim 8, wherein the second lubricant contains 0.5 to 10 mass % of the conductive carbon based on the total mass of the second lubricant.

10. The sliding member according to claim 9, wherein the second lubricant contains 2 to 8 mass % of the conductive carbon based on the total mass of the second lubricant.

11. The sliding member according to claim 1, wherein the conductive carbon is selected from the group consisting of carbon black, carbon nanotubes, carbon nanohorns, carbon nanofibers, graphene, and graphite.

12. The sliding member according to claim 1, wherein the second lubricant further contains polytetrafluoroethylene as the second additive.

13. The sliding member according to claim 1, wherein the first lubricant and the second lubricant further contain a thickener and are in a form of a grease composition.

14. The sliding member according to claim 1, wherein sliding member is a sliding member for an automobile.

15. The sliding member according to claim 1, wherein sliding member is a propeller shaft.

16. The sliding member according to claim 14, wherein the sliding member is a front suspension system.

17. A sliding member, comprising:
   a first sliding portion that has a first friction sliding mechanism having at least two first parts and that has a first lubricant placed between the first parts; and
   a second sliding portion that has a second friction sliding mechanism having at least two second parts and that has a second lubricant placed between the second parts, wherein:
   fed;
   the first sliding portion has a lubricant feed port from which the first lubricant is fed;
   the second sliding portion has no lubricant feed port from which the second lubricant is the first lubricant contains first base oil and a first additive;
   the second lubricant contains second base oil and a second additive containing conductive carbon; and
   the second lubricant contains a relatively larger amount of the conductive carbon than the first lubricant;

wherein the second lubricant contains 0.1 to 15 mass % of the conductive carbon based on total mass of the second lubricant.

\* \* \* \* \*